US010120125B1

(12) United States Patent
Kuo et al.

(10) Patent No.: US 10,120,125 B1
(45) Date of Patent: Nov. 6, 2018

(54) LUMINOUS CUP-SHAPED BODY

(71) Applicants: Chia-Shin Kuo, New Taipei (TW); Yu-Feng Kuo, New Taipei (TW)

(72) Inventors: Chia-Shin Kuo, New Taipei (TW); Yu-Feng Kuo, New Taipei (TW)

(*) Notice: Subject to any disclaimer, the term of this patent is extended or adjusted under 35 U.S.C. 154(b) by 0 days.

(21) Appl. No.: 15/641,295

(22) Filed: Jul. 4, 2017

(51) Int. Cl.
*F21V 8/00* (2006.01)
*F21V 23/04* (2006.01)

(52) U.S. Cl.
CPC ............ *G02B 6/0095* (2013.01); *F21V 23/04* (2013.01); *G02B 6/0045* (2013.01); *G02B 6/0083* (2013.01)

(58) Field of Classification Search
CPC .............................. F21V 7/0091; F21V 5/046
USPC ......................................................... 362/611
See application file for complete search history.

(56) References Cited

U.S. PATENT DOCUMENTS

| 9,163,826 | B1* | 10/2015 | Citrin ................ A47G 19/2227 |
| 9,322,520 | B1* | 4/2016 | Li ......................... G02B 6/0011 |
| 2013/0105434 | A1* | 5/2013 | Levy .................... B65D 47/243 |
| | | | 215/228 |
| 2014/0300273 | A1* | 10/2014 | LeBrun ................... G09F 23/06 |
| | | | 315/76 |

* cited by examiner

*Primary Examiner* — Toan Ly
(74) *Attorney, Agent, or Firm* — Chun-Ming Shih; HDLS IPR Services

(57) ABSTRACT

A luminous cup-shaped body includes a light-permissible cup (10), a power supply module (20) and a lighting unit (30). The light-permissible cup (10) has a base (11) and a ring body (12) extending from the base (11). The light-guiding structure (122) is formed on a surface of the ring body (12). The power supply module (20) is fixed on the base (11). The lighting unit (30) is correspondingly installed on the base (11) and electrically connected to the power supply module (20). Thereby, the light-permissible cup (10) can be completely equably lit up.

9 Claims, 5 Drawing Sheets

LUMINOUS CUP-SHAPED BODY

BACKGROUND OF THE INVENTION

1. Technical Field

The invention relates to technology of a cup-shaped body, particularly to a luminous cup-shaped body.

2. Related Art

Because light emitting diodes (LEDs) oppose advantages of low power consuming, long lighting distance and various color temperatures, they have excessively been applied in apparatuses of daily life. For example, LEDs are used in not only lighting, but also modeling cups and caps of PET bottles. This creates a new visual effect to attract people's attention and also increases an additional value of products.

However, existing products of luminous modeling cup or bottle cap still have drawbacks of power supplement and design of lighting status. For example, monotonic or partial light is generated, assembling is not easy, and portability and electricity maintenance and replacement are inconvenient.

SUMMARY OF THE INVENTION

An object of the invention is to provide a luminous cup-shaped body, which can achieve an effect of completely equably lighting by a light guiding structure.

To accomplish the above object, the invention relates to a luminous cup-shaped body and includes a light-permissible cup, a power supply module and a lighting unit. The light-permissible cup has a base and a ring body extending from the base. The light-guiding structure is formed on a surface of the ring body. The power supply module is fixed on the base. The lighting unit is correspondingly installed on the base and electrically connected to the power supply module.

The invention has other functions. The power supply module and the lighting unit can be easily assembled to the light-permissible cup by the arrangement of the posts, passing holes, positioning rods and through holes. By the engagement between the inner engagement ring of the cover and the outer engagement ring of the ring body, a sealing effect can be achieved.

DETAILED DESCRIPTION OF THE INVENTION

Figure 1:
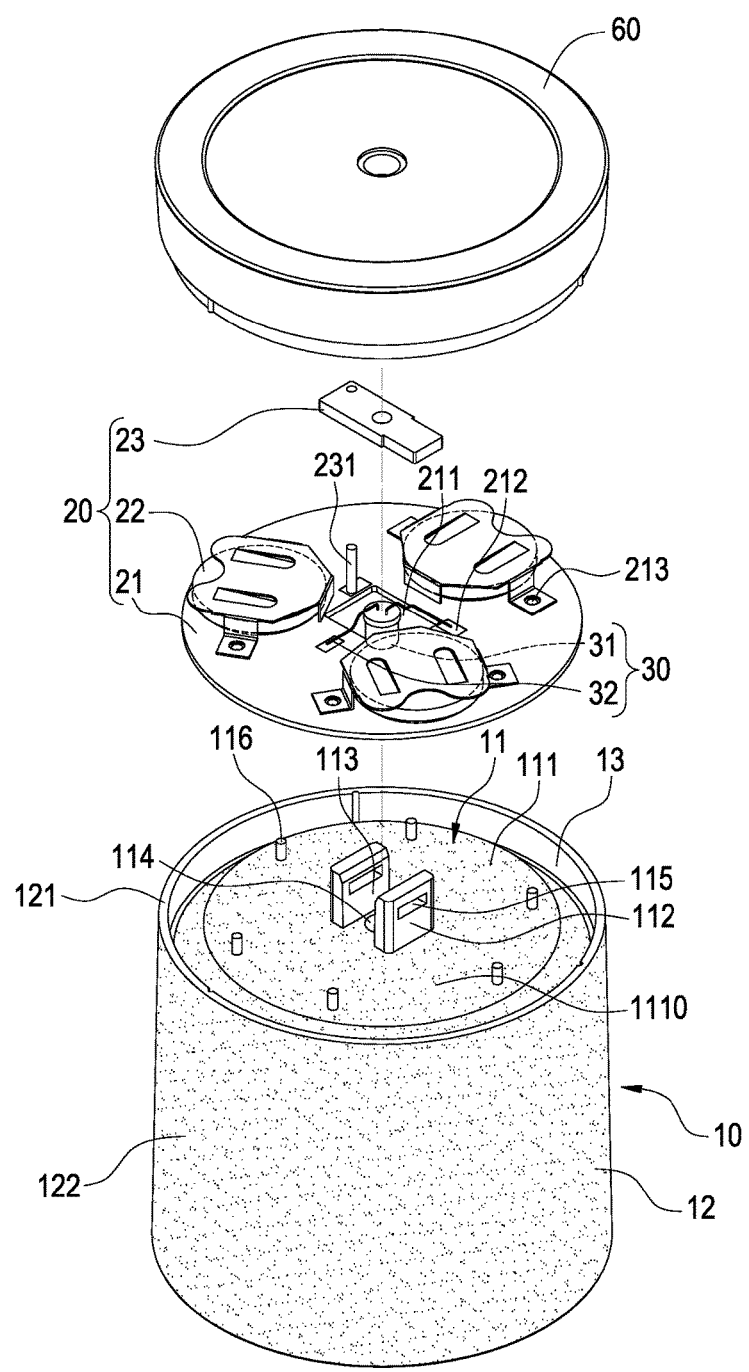
FIG. 1 is an exploded view of the luminous cup-shaped body of the invention.
Figure 2:
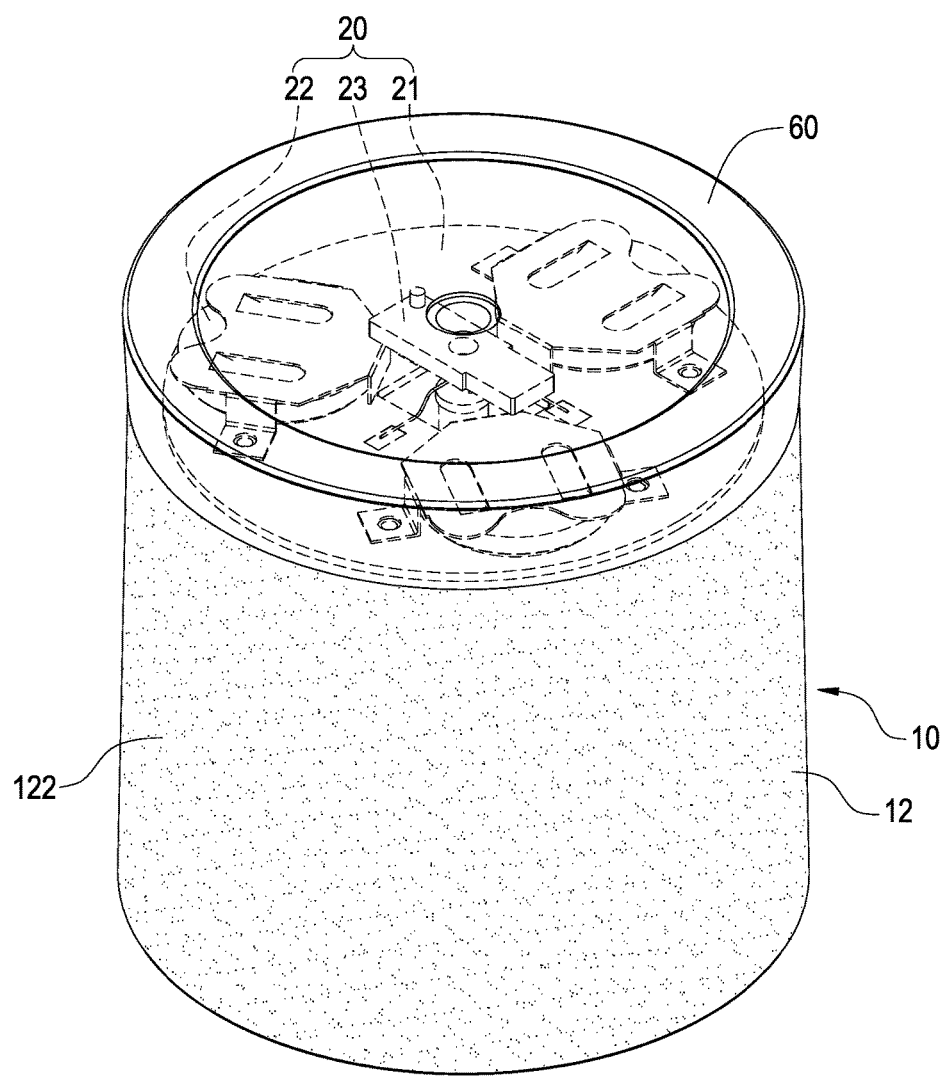
FIG. 2 is an assembled view of the luminous cup-shaped body of the invention.
Figure 3:
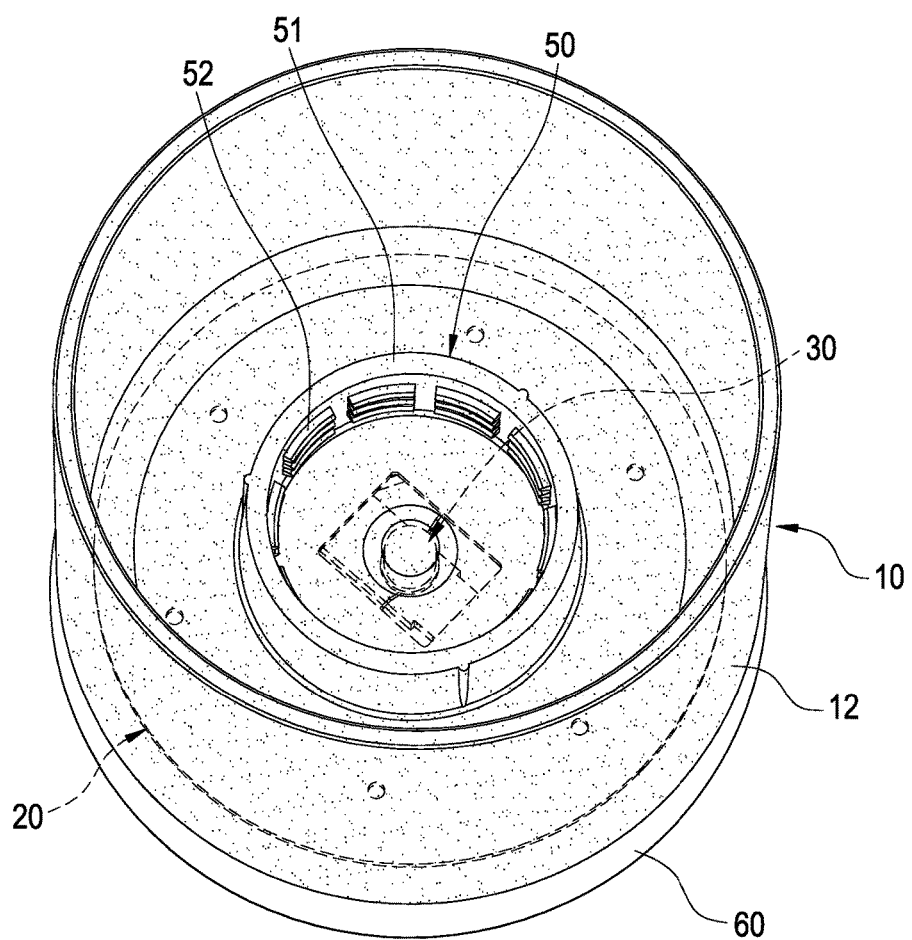
FIG. 3 is a perspective view of the luminous cup-shaped body of the invention.
Figure 4:
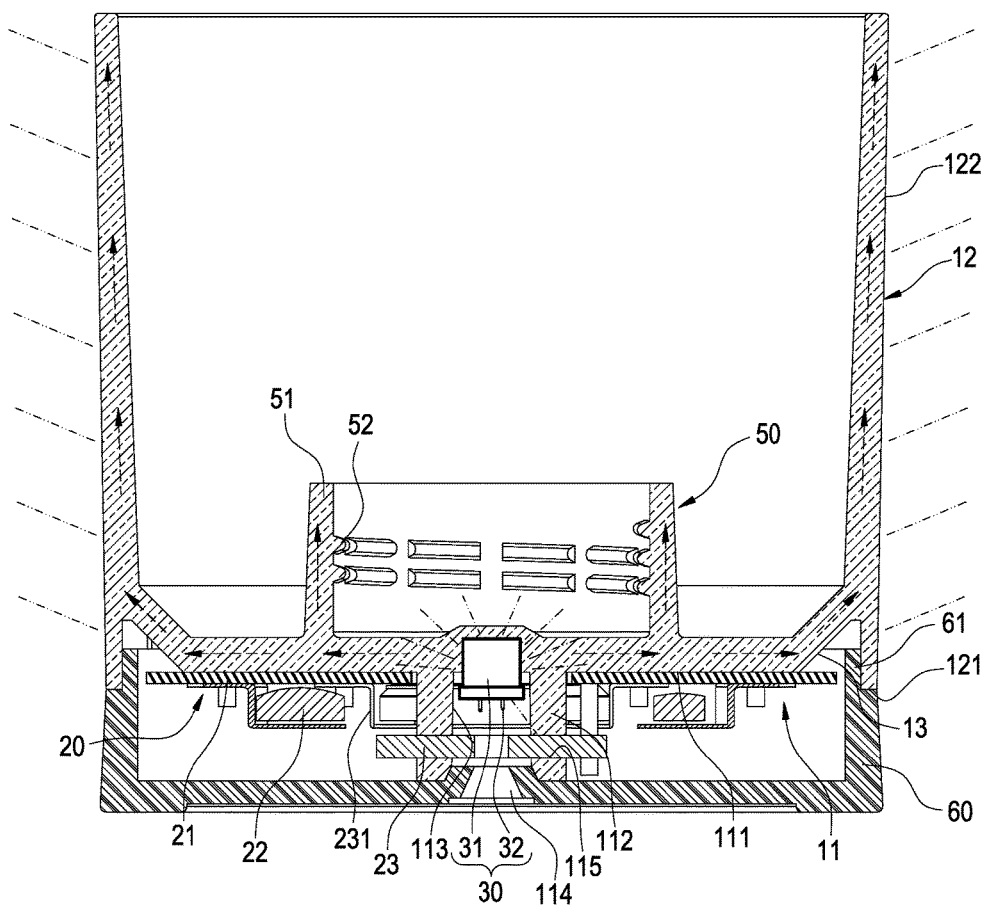
FIG. 4 is a cross sectional view of the luminous cup-shaped body of the invention.

Please refer to FIGS. 1-4. The invention relates to a luminous cup-shaped body and includes a light-permissible cup 10, a power supply module 20 and a lighting unit 30.

The light-permissible cup 10 may be made of PMMA (poly (methyl methacrylate)) resin and has a base 11 and a ring body 12. The base 11 has a circular plate 111. A reflecting structure 1110 is disposed on a surface of the circular plate 111. The reflecting structure may be a reflecting sheet or a reflecting layer, by which the light emitted by the lighting unit 30 can be reflected. The center of the circular plate 111 is upright extended with a pair of posts 112. An interval 113 is formed between the posts 112. A receiving hole 114 is formed at the center of the circular plate 111 and between the posts 112. A slot 115 is formed in the top of each of the posts 112. A plurality of positioning rods 116 are formed on the surface of the circular plate 111 and around the posts 112.

The ring body 12 extends from the periphery of the base 11. In the shown embodiment, the ring body 12 is, but not limited to, a circular body. Any other shapes are available. A light guiding slant 13 is arranged between the ring body 12 and the circular plate 111 for guiding the light to the ring body 12. The bottom of the ring body 12 is formed with an outer engagement ring 121. An inner surface and outer surface of the ring body are separately formed with a light guiding structure 122 which may be a texture pattern, printing pattern or etching pattern made by machining, printing or etching.

The power supply module 20 is fixed on the base 11 and includes a circuit board 21, a plurality of battery 22 and a proximity switch 23. A side of the circuit board 21 is disposed with copper foil circuits (not shown). The battery 22 is fixed on the circuit board 21 and is electrically connected to the copper foil circuits. The center of the circuit board 21 is provided with a passing hole 211. Two contacts 212 are arranged near the passing hole 211. Two through holes 213 are provided at two sides of each battery 22. The proximity switch 23 is electrically connected to the copper foil circuits of the circuit board 21 through a conductive rod 231.

The lighting unit 30 of the instant embodiment is an LED having a lamp body 31 and two leads 32 electrically connected to the lamp body 31. The lamp body 31 correspondingly passes through the passing hole 211. The leads 32 are separately connected to the contacts 212 by soldering. The proximity switch 23 is used for turning on/off the lamp body 21.

When assembling, the passing hole 211 is passed by the posts 112, the lamp body 31 is also inserted into the receiving hole 114, and the positioning rods 116 separately pass through the through holes 213. Next, the proximity switch 23 is correspondingly connected to the posts 112 and is positioned in the slots 115 to make an electric connection with the circuit board 21 through the conductive rod 231.

Further, the luminous cup-shaped body of the invention includes a threaded ring 50. The threaded ring 50 upright extends from the base 11 and inside the ring body 12. The threaded ring 50 has a circular ring 51 and an inner thread 52 formed on an inner wall of the circular ring 51 so as to form a luminous bottle cap.

Further, the luminous cup-shaped body of the invention includes a cover 60 which correspondingly covers an exposed side of the base 11 for accommodating the power supply module 20 and the lighting unit 30 in a space between the cover 60 and the base 11. A periphery of the cover 60 is extended with an inner engagement ring 61 for engaging with the outer engagement ring 121 of the ring body 12.

When using, a user puts his/her finger on the center of the cover 60 to turn on the lighting unit 30 through the proximity switch 23. The light from the lighting unit 30 travels from the receiving hole 114 of the base 11 toward outside of the base 11. A part of the light continues to travel along inside of the ring body 12 upward and another part of the light emits outward through the light guiding structure. As a result, the ring body 12 can be completed equably lit up.

Figure 5:
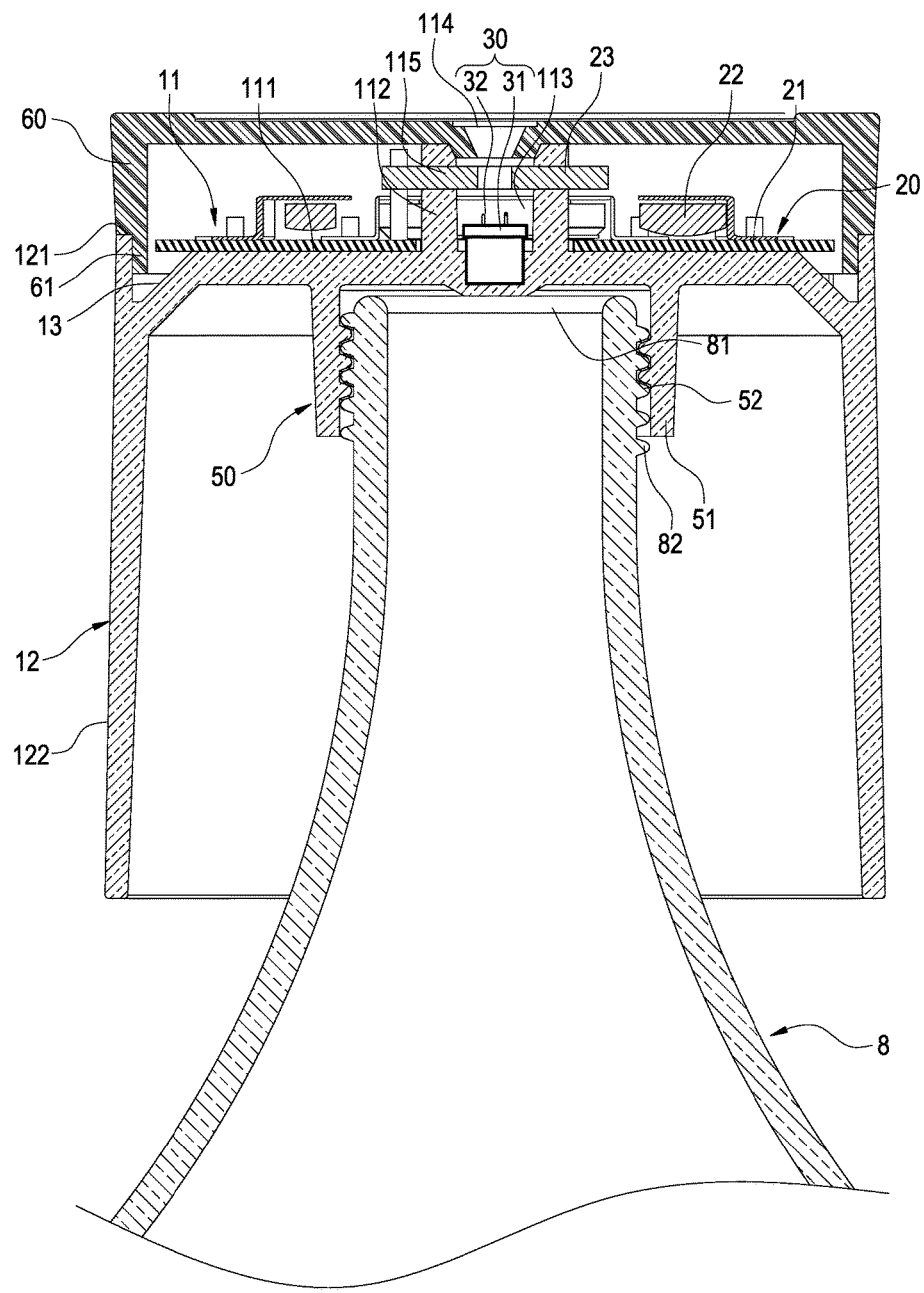
FIG. 5 is a cross sectional view of the luminous cup-shaped body of the invention applied to a bottle.

Please refer to FIG. 5. The luminous cup-shaped body of the invention can be applied to a bottle 8. The lip 81 of the bottle 8 is formed with an outer thread 82 for screwing with the inner thread 52 of the threaded ring 50.

It will be appreciated by persons skilled in the art that the above embodiment has been described by way of example only and not in any limitative sense, and that various alterations and modifications are possible without departure from the scope of the invention as defined by the appended claims.

What is claimed is:

1. A luminous cup-shaped body comprising:
   a light-permissible cup (10), having a base (11) and a ring body (12) extending from the base (11), a light-guiding structure (122) being formed on a surface of the ring body (12);
   a power supply module (20), fixed on the base (11); and
   a lighting unit (30), correspondingly installed on the base (11) and electrically connected to the power supply module (20),
   wherein the base (11) has a circular plate (111) and a pair of posts (112) extending from the circular plate (111), an interval (113) is formed between the posts (112), and a receiving hole (114) is formed in the circular plate (111) and between the posts (112), the lighting unit (30) has a lamp body (31), and the lamp body (31) passes through the receiving hole (114).

2. The luminous cup-shaped body of claim 1, wherein a slot (115) is formed in a top of each of the posts (112), and the power supply module (20) comprises a proximity switch (23) connected to the posts (112) and positioned in the slots (115).

3. The luminous cup-shaped body of claim 1, wherein a light guiding slant (13) is arranged between the ring body (12) and the circular plate (111), and a reflecting structure (1110) is disposed on a surface of the circular plate (111).

4. The luminous cup-shaped body of claim 1, wherein the light guiding structure (122) is formed by a texture pattern, printing pattern or etching pattern.

5. The luminous cup-shaped body of claim 1, further comprising a threaded ring (50) upright extending from the base (11) and inside the ring body (12).

6. The luminous cup-shaped body of claim 5, wherein the threaded ring (50) has a circular ring (51) and an inner thread (52) formed on an inner wall of the circular ring (51).

7. The luminous cup-shaped body of claim 1, further comprising a cover (60) which correspondingly covers an exposed side of the base (11) for accommodating the power supply module (20) and the lighting unit (30) in a space between the cover (60) and the base (11).

8. The luminous cup-shaped body of claim 7, wherein a periphery of the cover (60) is extended with an inner engagement ring (61) for engaging with the outer engagement ring (121) of the ring body (12).

9. A luminous cup-shaped body comprising:
   a light-permissible cup (10), having a base (11) and a ring body (12) extending from the base (11), a light-guiding structure (122) being formed on a surface of the ring body (12);
   a power supply module (20), fixed on the base (11); and
   a lighting unit (30), correspondingly installed on the base (11) and electrically connected to the power supply module (20),
   wherein the power supply module (20) comprises a circuit board (21), the circuit board (21) is provided with a passing hole (211), the lighting unit (30) has a lamp body (31) and two leads (32) electrically connected to the lamp body (31), the lamp body (31) correspondingly passes through the passing hole (211), and the leads (32) are separately connected to the contacts (212) by soldering.

\* \* \* \* \*